United States Patent [19]
Koide et al.

[11] Patent Number: 5,093,025
[45] Date of Patent: Mar. 3, 1992

[54] CHOLESTERIC LIQUID CRYSTAL POLYESTER CONTAINING OPTICALLY ACTIVE GROUP

[75] Inventors: Naoyuki Koide, Kunitachi; Kazuyoshi Iimura, Irumashi; Kazutaka Taki, Tokyo, all of Japan

[73] Assignee: Tosoh Corporation, Shinnanyo, Japan

[21] Appl. No.: 497,657

[22] Filed: Mar. 23, 1990

[30] Foreign Application Priority Data

Apr. 7, 1989 [JP] Japan .................................. 1-86882

[51] Int. Cl.$^5$ .................. C09K 19/52; C09K 19/12; C08G 63/00; C08G 63/02
[52] U.S. Cl. ..................... 252/299.01; 528/176; 528/193; 528/194; 528/272; 528/274; 528/286; 252/299.62; 252/299.66
[58] Field of Search ............ 252/299.62, 299.01, 252/299.66; 528/176, 193, 194, 272, 274, 286

[56] References Cited

U.S. PATENT DOCUMENTS

| | | | |
|---|---|---|---|
| 4,390,681 | 6/1983 | Deex | 528/193 |
| 4,493,532 | 1/1985 | Kaneko et al. | 350/349 |
| 4,528,113 | 7/1985 | Imazeki et al. | 252/299.1 |
| 4,588,517 | 5/1986 | Kaneko et al. | 252/299.1 |
| 4,652,626 | 3/1987 | Orii et al. | 528/194 |
| 4,737,310 | 4/1988 | Imazeki et al. | 252/299.1 |

FOREIGN PATENT DOCUMENTS 62-81448 4/1987 Japan .......................... 252/299.66

OTHER PUBLICATIONS

"3rd Bilateral Macromolecular Symposium" Mar. 26-31, 1988, pp. 8 and 9, 20 and 21.

*Primary Examiner*—Robert L. Stoll
*Assistant Examiner*—C. Harris
*Attorney, Agent, or Firm*—Oblon, Spivak, McClelland, Maier & Neustadt

[57] ABSTRACT

A cholesteric liquid crystal polyester high molecular weight polymer has, as structural units, (1) —O—Ar—CO—, (2) camphoric acid, (3) —O—$R_1$—O— and (4) —CO—$R_2$—CO—, wherein Ar is a bivalent aromatic ring having 6–12 carbon atoms, and $R_1$ and $R_2$ are bivalent aromatic rings having 6–18 carbon atoms, a bivalent aliphatic chain having 2–16 carbon atoms, or a bivalent alicyclic ring having 6–18 carbon atoms. The liquid crystal polyester exhibits high physical properties, including strength and elasticity modulus, with reduced mechanical anisotropy, while exhibiting selective visible light reflection under certain conditions.

1 Claim, No Drawings

CHOLESTERIC LIQUID CRYSTAL POLYESTER CONTAINING OPTICALLY ACTIVE GROUP

BACKGROUND OF THE INVENTION

1. Field of the Invention

The present invention relates to a novel liquid crystal polyester which is melt-moldable, having high strength and high modulus of elasticity, and which is less anisotropic in mechanical properties when molded, exhibiting under a certain condition selective reflection in the visible light region.

2. Description of the Related Art

Recently, demand of materials superior in rigidity, heat-resistance, and chemical resistance has been increasing in all of the fields of fibers, films, and molded articles. Most of polyesters, which are used widely for general molded articles, are inferior in mechanical properties such as flexural modulus, etc., and are not suitable for the uses where high strength and high modulus of elasticity are required. Although blending of a filler or a reinforcing agent such as calcium carbonate, glass fiber, and the like is known to be effective in improving such mechanical properties, the blended materials involve various practical problems such that the specific gravity of the blended materials tend to increase to cancel the lightweight property, and abrasion of a molding machine during molding is serious Liquid crystal polyesters have recently attracted attention as a polyester which does not require the addition of a reinforcing agent and is suitable for uses requiring high strength and high modulus of elasticity. Particular attention has been given to the liquid crystal polyesters, since a thermoplastic liquid crystal polyester consitituted from polyethylene terephthalate and hydroxybenzoic acid was disclosed by W. J. Jackson in U.S. Pat. No. 3,804,805, and in J. Polymer Science polymer Chemistry Edition, Vol. 14, p.2043, (1976). Since then, various liquid crystal polyesters have been studied to develop polyesters having simultaneously high strength, improved rigidity, and melt-moldability. However, few molded articles have been found which is free from the above problems. This is because those liquid crystal polymers exhibit high orientation in a molten state, giving great anisotropy in the mechanical properties thereof.

For cancelling the anisotropy, a method was disclosed which employs cholesteric liquid crystal polymer by W. R. Krigbaum (U.S. Pat. No. 4,412,059). This method, however, is disadvantageous in that the rate of transesterification is low, and optically active units cannot be introduced in an arbitrary amount into the polymer, and further that the physical properties become impaired, or the liquid crystal-forming region is lowered depending on the bonding type of the structural units.

SUMMARY OF THE INVENTION

An object of the present invention is to provide a novel liquid crystal polyester which is moldable in a molten state, having high strength and high modulus of elasticity, exhibiting less mechanical anisotropy, and exhibiting selective reflection in the visible light region under a certain condition.

Another object of the present invention is to provide a liquid crystal polyester containing optically active groups, such as a cholesteric liquid crystal polyester, into which optically active units can be introduced in the polymer chain in an arbitrary amount, and an arbitrary pitch of cholesteric helical structure can be given.

The present invention provides a liquid crystal polyester constituted of the structural units (A), (B), (C) and (D) shown below:

(A) —O—Ar—CO— where Ar is a bivalent aromatic ring having 6 to 12 carbons:

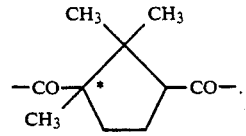

where the mark * denotes optical activity;

(C) —O—$R_1$—O—;

(D) —CO—$R_2$—CO— where $R_1$ and $R_2$ are respectively a bivalent aromatic ring having 6 to 18 carbons, a bivalent aliphatic chain having 2 to 16 carbons, or a bivalent alicyclic ring having 6 to 18 carbons.

DETAILED DESCRIPTION OF THE INVENTION

In the cholesteric liquid crystal polyester of the present invention the monomers constituting the structural unit (A) include those derived from aromatic hydroxy carboxylic acids or derivatives thereof having bivalent aromatic ring, Ar having 6 to 12 carbons. Examples of such aromatic ring are:

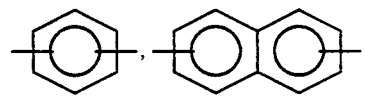

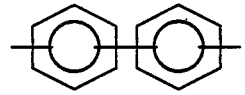

In the aromatic rings, one or more of the hydrogens may further be substituted by an alkyl, an alkoxy, a phenyl, or a halogen, or the like. Specific examples are p-hydroxybenzoic acid, 2-hydroxy-6 naphthoic acid, 4,4'-hydroxybiphenylcarboxylic acid, and their derivatives.

The monomer units constituting the structural unit (B) include camphoric acid.

The monomer units constituting the structural unit (C) include diols and their derivatives, $R_1$ representing bivalent aromatic rings having 6 to 18 carbons, bivalent aliphatic chains having 2 to 16 carbons, or bivalent alicyclic rings having 6 to 18 carbons. Examples of such aromatic rings are:

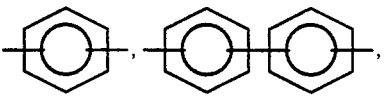

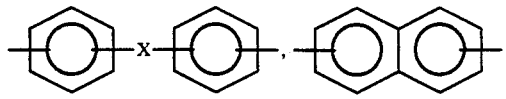

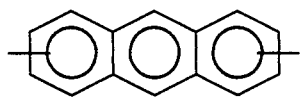

In the aromatic rings, one or more of the hydrogens may further be substituted by an alkyl, an alkoxy, a phenyl, or a halogen, or the like. Specific examples are hydroquinone, resorcinol, 4,4'-biphenol, 4,4'-dihydroxydiphenyl ether 2,6-naphthalenediol, ethylene glycol, butanediol, heaxanediol, trans-cyclohexanediol, cis-cyclohexanediol, and their derivatives.

The monomer units constituting the structural unit (D) include dicarboxylic acids and their derivatives, $R_2$ representing bivalent aromatic rings having 6 to 18 carbons, bivalent aliphatic chains having 2 to 16 carbons, or bivalent alicyclic rings having 6 to 18 carbons. Examples of such aromatic rings are:

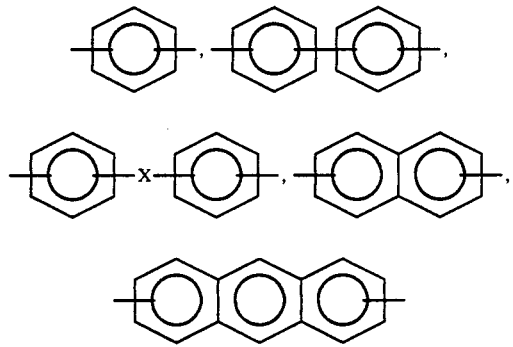

In the aromatic rings, one or more of the hydrogens may further be substituted by an alkyl, an alkoxy, a phenyl, or a halogen, or the like. Specific examples are terephthalic acid, isophthalic acid, 4,4'-diphenyldicarboxylic acid, 2,6-naphthalene dicarboxylic acid, adipic acid, sebacic acid, trans-cyclohexane dicarboxylic acid, cis-cyclohexane dicarboxylic acid, and their derivatives.

The amount of the structural unit (A) should be in the range of from 20 to 90 mole %, particularly preferably from 30 to 70 mole % of the whole polymer: the amount of the structural unit (B) should be in the range of from 5 to 40 mole % of the whole polymer; the amount of the structural unit (C) should be in the range of from 5 to 40 mole % of the whole polymer; and the amount of the structural unit (D) should be in the range of 0 to 30 mole % of the whole polymer, provided that the total of the amounts of the structural units (A), (B), (C) and (D) be 100 mole %.

The structural units (A), (C) and (D) may respectively consist of one component, or more components.

In principle, the amount of the structural unit (C) should be equivalent to the sum of the amounts of the structural units (B) and (D), which may be deviated more or less from this amount for the purpose of adjusting the molecular weight. The molecular weight may also be controlled by capping the terminal group with a monofunctional monomer such as 4-hydroxydiphenyl, diphenylcarboxylic acid, and the like.

The structural unit (B) which is the indispensable component to obtain the optically active cholesteric liquid crystal polyester, may be either one of a D-isomer or an L-isomer separated from a DL racemic mixture. Moreover, the mixture of the D- and L-isomers in which either one of the D-isomer or the L-isomer is predominant may be applicable, since such a mixture exhibits optical activity, even though the efficiency of evolution of optical activity is lower as compared with the single use of a pure D-isomer or a pure L-isomer. Generally, the difference of the contents of the D-isomer and the L-isomer should be 15 % or more, preferably 30 % or more.

The cholesteric liquid crystal polyester containing an optically active group according to the present invention is a polyester which, in a molten state, shows the cholesteric liquid properties and must contain a mesogenic unit for formation of liquid crystal in its structure. For the mesogenic unit a structure in which two or more units (A) are continued, for example, may be mentioned.

With the composition according to the present invention, when the ester polymerization reaction is made in accordance with the disclosure the mesogenic unit is produced by the reaction between the structural units (A), for example, to show the cholesteric liquid crystal properties.

A cholesteric liquid crystal polymer takes a structure such that nematic liquid crystal layers are induced by optically active units to shift by a certain degree of angle, layer by layer. The shifts will cause selective reflection of incident light to give characteristic color called a cholesteric color, when the shifts correspond to the wavelength of visible light.

Cholesteric liquid crystal polymers which are rigid and contain optically active monomer units copolymerized in the main chain are expected to give molded articles which are strengthened in two axis directions just like in a laminated structure.

The thermoelastic polymers like the cholesteric liquid crystal polyester of the present invention is characterized in that the molded articles having superior mechanical properties and yet exhibiting smaller anisotropy of properties even when the articles are molded with a high shearing force.

The liquid crystal polyester containing optically active groups, when gradually heated on a hot stage of a polarized light microscope, is obsereved to transit at a certain temperature from a crystal state to a liquid crystal state. Under certain conditions, a fingerprint texture, or an oily streak texture of the polymer is observed, which is a characteristic of cholesteric liquid crystal polymers. When the polyester is molded into a film and rapidly cooled, the cholesteric structure is retained, exhibiting a cholesteric color which varies depending on the content of the optically active component in the structural unit (B).

The cholesteric liquid crystal polyester containing optically active groups of the present invention can be prepared by a usual ester polymerization reaction. For example, in melt polymerization, monomers giving structural units (A), (B), (C) and (D) are blended and are heated to a temperature around 180° to 350° C. usually under a normal pressure to be polymerized. In order to promote the polymerization reaction, low-volatile compounds such as acetic acid formed by transesterification reaction is preferably removed from the reaction system. Accordingly, the polymerization reaction under a normal pressure is preferably conducted in a nitrogen stream. Further, after such low-volatile matters cease to distill out, the polymerization is continued under vacuum (such as 1 mmHg or lower) until a reaction rate of approximately 100 % and a suficiently high polymerization degree are obtained. A known polyester polymerization catalyst such as alkali metal salts, and salt of metals of Fe, Mn. Cd, Mg, Ca, Ba. Ti, Zn, Pb, Co, Sb, etc. may be added singly or combinedly. Naturally, the reaction proceeds without a catalyst. A phosphorus compound may be added as a decomposition inhibitor. As polyesters are generally strengthened after molding by heat-treatment, the polyester of the present invention is affected similarly.

The cholesteric liquid crystal polyester of the present invention has a reduced viscosity of not less than 0.2 dl/g, preferably 0.6 to 1.7 dl/g at a concentration of 0.5 g/dl at a temperature of 60° C. in a mixed solvent of phenol/tetrachloroethane (60/40 by weight). A small amount of an aromatic monocarboxylic acid, an aromatic dicarboxylic acid, an aromatic mono-ol, or an aromatic diol may be employed in order to control the molecular weight.

An additive such as reinforcing agent e.g., glass fiber, carbon fiber, aramid fiber, etc. or a nucleating agent may be added to the polyester to improve the properties of the molded articles.

The liquid crystal polyester containing optically active groups of the present invention thus prepared is melt-moldable at a temperature of not higher than 350° C., exhibiting less anisotropy in mechanical properties, and can be processed by usual melt-molding such as injection molding, extrusion molding, blow molding, and the like into molded products, fibers, films, etc. The polyester achieves molecular orientation by shearing force during working, giving molded product having high strength and high dimensional stability, thus is valuable industrially.

DETAILED DESCRIPTION OF THE PREFERRED EMBODIMENTS

Examples and Comparative Examples will be described below which are intended to explain the practice of the present invention without limiting the invention in any way.

The phase transition temperatures (such as $T_g$, $T_m$, etc.) of the resulting polyester were measured by DSC at 10° C./min under nitrogen stream. The decomposition temperature ($T_d$) was measured by TG/DTA at 40° C./min under nitrogen stream.

The anisotropy of the resulting polyester in a molten state was confirmed by a polarized light microscope provided with a hot-stage.

The anisotropy of the resulting polyester in mechanical property was measured by molding a flat plate of 2 mm in depth, cutting out test specimens in TD direction and in MD direction, and testing according to ASTM Standard.

EXAMPLE 1

In a polymerization vessel made of glass provided with a stirrer, a nitrogen-gas-introducing tube, and a condenser, there were placed 1932 g (14 moles) of p-hydroxybenzoic acid, 600 g (3 moles) of d-camphoric acid, 558 g (3 moles) of p,p'-biphenol, and 2244 g (22 moles) of acetic anhydride. After the vessel was purged by nitrogen, the temperature of the vessel was raised to 150° C. and the temperature was kept for 2 hours with nitrogen gas flowing therethrough to conduct active esterification of hydroxy groups. Thereafter, reaction temperature was gradually raised up to 320° C. while the byproduct acetic acid is distilled off. One hour later, the polymerization system was gradually evacuated to a vacuum of 1 mmHg, maintained the vacuum for two hours, and then the polymerization was finished. After cooling the polymerization system, the resulting polymer was removed by breaking the polymerization vessel.

Thermal analysis of the polymer by DSC (temperature raising rate: 10° C./min) gave $T_g$ (glass transition temperature) of 130° C., an endothermic peak at 330° C., and $T_d$ (decomposition temperature) of 440° C. A fingerprint texture was observed at 325° C. during the temperature-raising process under a polarized light microscope.

This polymer, having been melted and made into a film, did not show cholesteric color. The solution viscosity was 1.2 dl/g.

The resulting polymer was injection-molded into a flat plate of 2 mm in depth. Therefrom test specimens were cut our in TD direction and MD direction. The mechanical properties measured were shown in the Table.

EXAMPLE 2

In a polymerization vessel described in Example 1, there were placed 1656 g (12 moles) of p-hydroxybenzoic acid, 800 g (4 moles) of d-camphoric acid, 744 g (4 moles) of 4,4'-biphenol, and 2244 g (22 moles) of acetic anhydride. Polymerization was conducted in the same manner as in Example 1.

$T_g$ of 130° C., and $T_d$ of 420° C. were observed by DSC measurement.

Oily streak texture was observed at 285° C. by polarized light microscopy. This polymer exhibited chloresteric color.

The solution viscosity was 1.1 dl/g. The mechanical properties are shown in the Table.

EXAMPLE 3

In a polymerization vessel described in Example 1, there were placed 828 g (6 moles) of p-hydroxybenzoic acid, 1400 g (7 moles) of d-camphoric acid, 1302 g ( 7 moles) of 4,4'-biphenol, and 2244 g (22 moles) of acetic anhydride. Polymerization was conducted in the same manner as in Example 1.

$T_g$ of 118° C., and $T_d$ of 380° C. were observed by DSC measurement.

Oily streak texture was observed at 270° C. by polarized light microscopy This polymer also exhibited cholesteric color.

The solution viscosity of this polymer was 1.2 dl/g. The mechanical properties are shown in the Table.

EXAMPLE 4

In a polymerization vessel described in Example 1, there were placed 1656 g (12 moles) of p-hydroxybenzoic acid, 600 g (3 moles) of d-camphoric acid, 744 g (4 moles) of 4,4'-biphenol, 166 g (1 mole) of terephthalic acid, and 2244 g (22 moles) of acetic anhydride. Polymerization was conducted in the same manner as in Example 1.

This polymer was observed to have an endothermic peak at 315° C., $T_g$ at 131° C., and $T_d$ at 430° C. A fingerprint texture was observed at 320° C. by polarized light microscopy. Cholesteric color was not observed.

The solution viscosity of this polymer was 1.2 dl/g. The mechanical properties of the polymer are shown in the Table.

COMPARATIVE EXAMPLE 1

In a polymerization vessel described in Example 1, there were placed 276 g (2 moles) of p-hydroxybenzoic acid, 1800 g (9 moles) of d-camphoric acid, 1674 g (9 moles) of 4,4'-biphenol, and 2244 g (22 moles) of acetic anhydride. Polymerization was conducted in the same manner as in Example 1.

This polymer did not exhibit a liquid crystal property.

COMPARATIVE EXAMPLE 2

In a polymerization vessel described in Example 1, there were placed 2622 g (19 moles) of p-hydroxybenzoic acid, 100 g (0.5 mole) of d-camphoric acid, 93 g (0.5 mole) of 4,4'-biphenol, and 2244 g (22 moles) of acetic anhydride. Polymerization was conducted in the same manner as in Example 1.

$T_m$ of 345° C., and $T_d$ of 480° C. were observed by DSC measurement.

A liquid crystal property was observed by polarized light microscopy, but the structure was not clear.

COMPARATIVE EXAMPLE 3

In a polymerization vessel described in Example 1, there were placed 1656 g (12 moles) of p-hydroxybenzoic acid, 800 g (4 moles) of D,L-camphoric acid, 744 g (4 moles) of 4,4'-biphenol, and 2244 g (22 moles) of acetic anhydride. Polymerization was conducted in the same manner as in Example 1.

$T_g$ of 132° C., and $T_d$ of 425° C. were observed by DSC measurement.

A liquid crystal property was observed at 270° C. by polarized light microscopy. However, the liquid crystal exhibited neither a fingerprint texture nor an oily streak texture, namely, characteristics of cholesteric liquid crystals. The mechanical properties of this polymer are shown in the Table.

COMPARATIVE EXAMPLE 4

In a polymerization vessel described in Example 1, there were placed 1932 g (14 moles) of p-hydroxybenzoic acid, 744 g (4 moles) of 4,4'-biphenol, 266 g (1.6 moles) of terephthalic acid, 384 g (2.4 moles) of r-(+)-3-methyladipic acid, 2470 g (24.2 moles) of acetic anhydride. Polymerization was conducted in the same manner as in Example 1.

$T_m$ of 160° C., and $T_d$ of 250° C. were observed by DSC measurement.

Oily streak texture was observed at 160° C. by polarized light microscopy.

This polymer had a very low decomposition temperature.

COMPARATIVE EXAMPLE 5

In a polymerization vessel described in Example 1, there were placed 1932 g (14 moles) of p-hydroxybenzoic acid, 1140 g (6 moles) of 2-hydroxy-6-naphthoic acid, and 2244 g (22 moles) of acetic anhydride. The polymerization was conducted in the same manner as in Example 1, except that the polymerization temperature was 350° C.

This polymer had $T_m$ at 295° C., and $T_d$ at 505° C.

This polymer was observed to have a liquid crystal property at 280° C. by polarized light microscopy, but was not cholesteric liquid crystal. The mechanical properties of the polymer is shown in the Table.

TABLE

|  | TD direction flexural strength (Kgf/cm²) | MD direction flexural strength (kgf/cm²) | TD/MD ratio |
| --- | --- | --- | --- |
| Example 1 | 1000 | 2100 | 0.47 |
| Example 2 | 1050 | 1900 | 0.55 |
| Example 3 | 950 | 1600 | 0.60 |
| Example 4 | 850 | 1900 | 0.45 |
| Comparative example 3 | 550 | 1900 | 0.29 |
| Comparative example 5 | 650 | 2500 | 0.26 |

What is claimed is:

1. A cholesteric liquid crystal polyester containing an optically active group, constituted of the structural units, (A), (B), (C) and (D), in an amounts of 20 to 90 mole % of (A), 5 to 40 mole % of (B), 5 to 40 mole % of (C), and 0 to 30 mole % of (D), and having a reduced viscosity of not less than 0.2 dl/g at a temperature of 60° C. at a concentration of 0.5 g/dl in a mixed solvent of phenol/tetrachloroethane (60/40 by weight):

(A) —O—Ar—CO— where Ar is a bivalent aromatic ring having 6 to 12 carbons;

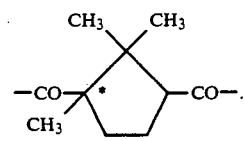

where the mark * denotes optical activity;

(C) —O—R$_1$—O—;

(D) —CO—R$_2$—CO— where R$_1$ and R$_2$ are respectively a bivalent aromatic ring having 6 to 18 carbons, a bivalent aliphatic chain having 2 to 16 carbons, or a bivalent alicyclic ring having 6 to 18 carbons.

* * * * *